US010115055B2

(12) United States Patent
Weiss et al.

(10) Patent No.: US 10,115,055 B2
(45) Date of Patent: Oct. 30, 2018

(54) SYSTEMS METHODS CIRCUITS AND ASSOCIATED COMPUTER EXECUTABLE CODE FOR DEEP LEARNING BASED NATURAL LANGUAGE UNDERSTANDING

(71) Applicant: EVATURE TECHNOLOGIES (2009) LTD., Nes Ziona (IL)

(72) Inventors: Tal Weiss, Nes Ziona (IL); Amit Beka, Givatayim (IL)

(73) Assignee: BOOKING.COM B.V., Amsterdam (NL)

(*) Notice: Subject to any disclaimer, the term of this patent is extended or adjusted under 35 U.S.C. 154(b) by 145 days.

(21) Appl. No.: 14/992,041

(22) Filed: Jan. 11, 2016

(65) Prior Publication Data
US 2016/0350655 A1 Dec. 1, 2016

Related U.S. Application Data

(60) Provisional application No. 62/166,149, filed on May 26, 2015.

(51) Int. Cl.
*G06F 17/27* (2006.01)
*G06F 17/21* (2006.01)
*G06N 3/08* (2006.01)

(52) U.S. Cl.
CPC .......... *G06N 3/088* (2013.01); *G06F 17/279* (2013.01); *G06F 17/2785* (2013.01)

(58) Field of Classification Search
CPC ..... G06F 17/24; G06F 3/04883; G10L 15/15; G10L 15/063; G10L 17/02; G10L 17/28; G06N 3/0445; G06N 3/08; G06N 3/084

(Continued)

(56) References Cited

U.S. PATENT DOCUMENTS 5,428,710 A * 6/1995 Toomarian ............... G06N 3/08
706/25
5,720,003 A * 2/1998 Chiang ................ G06N 99/005
706/10

(Continued)

OTHER PUBLICATIONS

Wang et al, "Dialogue Processing with Neural Networks", 1992, Carnegie-Mellon University. Department of Computer Science, 1992, pp. 1-17.*

(Continued)

*Primary Examiner* — Olujimi Adesanya
(74) *Attorney, Agent, or Firm* — Vladimir Sherman; Professional Patent Solutions Ltd.

(57) ABSTRACT

Disclosed are systems, methods, circuits and associated computer executable code for deep learning based natural language understanding, wherein training of one or more neural networks, includes: producing character strings inputs 'noise' on a per-character basis, and introducing the produced 'noise' into machine training character strings inputs fed to a 'word tokenization and spelling correction language-model', to generate spell corrected word sets outputs; feeding machine training word sets inputs, including one or more 'right' examples of correctly semantically-tagged word sets, to a 'word semantics derivation model', to generate semantically tagged sentences outputs. Upon models reaching a training 'steady state', the 'word tokenization and spelling correction language-model' is fed with input character strings representing 'real' linguistic user inputs, generating word sets outputs that are fed as inputs to the word semantics derivation model for generating semantically tagged sentences outputs.

20 Claims, 5 Drawing Sheets

(58) Field of Classification Search
USPC .................... 704/231, 232, 235, 258, 259
See application file for complete search history.

(56) References Cited

U.S. PATENT DOCUMENTS

| | | | | |
|---|---|---|---|---|
| 7,047,493 B1* | 5/2006 | Brill | .................. | G06F 17/273 715/257 |
| 2006/0200253 A1* | 9/2006 | Hoffberg | ................ | G05B 15/02 700/19 |
| 2008/0319933 A1* | 12/2008 | Moussa | .................... | G06N 3/02 706/31 |
| 2015/0161101 A1* | 6/2015 | Yao | ...................... | G06N 3/0472 704/9 |
| 2015/0186355 A1* | 7/2015 | Baldwin | ............... | G06F 17/273 704/9 |
| 2015/0364128 A1* | 12/2015 | Zhao | .................... | G06N 3/0445 704/259 |

OTHER PUBLICATIONS

Contractor et al, "Unsupervised cleansing of noisy text.", 2010, Proceedings of the 23rd International Conference on Computational Linguistics: Posters. Association for Computational Linguistics, 2010, pp. 189-196.*

Han et al, "Automatically constructing a normalisation dictionary for microblogs." 2012, In Proceedings of the 2012 joint conference on empirical methods in natural language processing and computational natural language learning, pp. 421-432. Association for Computational Linguistics, 2012.*

Chrupala, "Normalizing tweets with edit scripts and recurrent neural embeddings.", Jun. 2014, In Proceedings of the 52nd Annual Meeting of the Association for Computational Linguistics, vol. 2, pp. 680-686. Baltimore, Maryland: Association for Computational Linguistics, 2014.*

Lewellen, "Neural network recognition of spelling errors." 1998, In Proceedings of the 36th Annual Meeting of the Association for Computational Linguistics and 17th International Conference on Computational Linguistics—vol. 2, pp. 1490-1492. Association for Computational Linguistics, 1998.*

Liu et al, "Insertion, deletion, or substitution?: normalizing text messages without pre-categorization nor supervision." 2011, In Proceedings of the 49th Annual Meeting of the Association for Computational Linguistics: Human Language Technologies: short papers—vol. 2, pp. 71-76. ACL.*

Al Azawi, Mayce, et al. "Character-level alignment using WFST and LSTM for post-processing in multi-script recognition systems—A comparative study." Oct. 2014, International Conference Image Analysis and Recognition. Springer, pp. 379-386.*

* cited by examiner

SYSTEMS METHODS CIRCUITS AND ASSOCIATED COMPUTER EXECUTABLE CODE FOR DEEP LEARNING BASED NATURAL LANGUAGE UNDERSTANDING

FIELD OF THE INVENTION

The present invention generally relates to the field of Natural Language Understanding (NLU). More specifically, some embodiments relate to systems, methods, circuits and associated computer executable code for deep learning based natural language understanding.

RELATED APPLICATIONS

The present application claims priority from U.S. Provisional Pat. App. No. 62/166,149 filed with the USPTO on May 26, 2015. Which is hereby incorporated by reference in its entirety.

BACKGROUND

The umbrella term "natural language understanding" can be applied to a diverse set of computer applications, ranging from small, relatively simple tasks such as short commands issued to robots, to highly complex endeavors such as the full comprehension of newspaper articles or poetry passages. Many real world applications fall between the two extremes, for instance text classification for the automatic analysis of emails and their routing to a suitable department in a corporation does not require in depth understanding of the text, but is far more complex than the management of simple queries to database tables with fixed schemata.

Throughout the years various attempts at processing natural language or English-like sentences presented to computers have taken place at varying degrees of complexity. Some attempts have not resulted in systems with deep understanding, but have helped overall system usability. For example, Wayne Ratliff originally developed the Vulcan program with an English-like syntax to mimic the English speaking computer in Star Trek. Vulcan later became the dBase system whose easy-to-use syntax effectively launched the personal computer database industry. Systems with an easy to use or English like syntax are, however, quite distinct from systems that use a rich lexicon and include an internal representation (often as first order logic) of the semantics of natural language sentences.

Hence the breadth and depth of "understanding" aimed at by a system determine both the complexity of the system (and the implied challenges) and the types of applications it can deal with. The "breadth" of a system is measured by the sizes of its vocabulary and grammar. The "depth" is measured by the degree to which its understanding approximates that of a fluent native speaker. At the narrowest and shallowest, English-like command interpreters require minimal complexity, but have a small range of applications. Narrow but deep systems explore and model mechanisms of understanding, but they still have limited application. Systems that attempt to understand the contents of a document such as a news release beyond simple keyword matching and to judge its suitability for a user are broader and require significant complexity, but they are still somewhat shallow. Systems that are both very broad and very deep are beyond the current state of the art.

Still, there remains a need, in the fields of computer learning and understanding, including computerized natural language understanding, for technologies that may facilitate the utilization of artificial neural networks based models for natural language understanding applications.

SUMMARY OF THE INVENTION

The present invention includes systems, methods, circuits, and associated computer executable code for deep learning based natural language understanding, wherein: (1) a word tokenization and spelling correction model/machine may generate corrected word sets outputs based on respective character strings inputs; and/or (2) a word semantics derivation model/machine may generate semantically tagged sentences outputs based on respective word sets inputs.

According to some embodiments, each of the models/machines may go through an 'offline' training/learning phase, wherein training (e.g. not 'real' user data/linguistic-inputs) data is separately inputted to each of the machines and corresponding language and semantic models evolve. The models may evolve and improve through training as the outputs of the machines are examined for their correctness and the machines' weights are accordingly calibrated/tuned/shifted (e.g. direction and magnitude of weight tuning increase/decrease corresponds to the level of correctness of the machine's output).

According to some embodiments of the present invention, the word tokenization and spelling correction model/machine training may be unsupervised (i.e. based on substantially large amounts of uncharacterized data) wherein noise is introduced into the input training data (e.g. incrementally) to increase and/or diversify the amounts and types of data errors encountered and learned by the machine.

According to some embodiments of the present invention, the word semantics derivation model/machine training may be weakly-supervised (i.e. based on substantially small amounts of characterized data, followed by substantially large amounts of uncharacterized data) wherein 'right' examples (e.g. word sets semantically tagged correctly) constitute the initial input training data, thus yielding a supervised training phase for providing the model with initial 'correct' knowledge, which may be followed by an unsupervised training phase that is based on uncharacterized data inputs for training the model on the utilization of the accumulated knowledge for semantically tagging 'incorrect'/un-encountered inputs. Both the supervised and unsupervised training phases may be repeated (in whole or in part) multiple times until sufficient accuracy and breadth of tagging are achieved.

According to some embodiments, once the system models were sufficiently trained and reached a 'steady state', actual 'real' user data inputs may be fed to them. According to some embodiments, character strings representing linguistic user inputs may be fed to the word tokenization and spelling correction model/machine, whereas outputs of the word tokenization and spelling correction model/machine—corrected word-sets/sentences—may be used as inputs for the word semantics derivation model/machine for it to generate outputs in the form of tokenized, corrected and semantically tagged sentences.

According to some embodiments, as part of an unsupervised, or weakly supervised, learning process, linguistic input training data may be put through the word tokenization and spelling correction model.

According to some embodiments, an unsupervised, or weakly supervised, learning process, executed by a word tokenization and spelling correction model of a system for Deep Learning may include: (1) receiving a string of one or more characters; (2) encoding and indexing the characters as a multi-value index; (3) embedding each character as a numbers vector; (4) entering a matrix of one or more character number vectors, as input, to a recurrent, or a convolutional, neural network language model, wherein the language model is adapted for: (i) parsing the data into words and tokenizing the words; (ii) correcting misspelled words; and/or (iii) auto-completing words; (5) repeating stages (1)-(4) one or more additional times, while intermittently introducing noise into the input and examining the language model's output; and/or (6) tuning the language model, and/or the amount and type of introduced noise, at least partially based on the language model's examined output(s).

According to some embodiments, as part of an unsupervised, or weakly supervised, learning process, linguistic input training data may be put through a word semantics derivation model.

According to some embodiments, an unsupervised, or weakly supervised, learning process, executed by a word semantics derivation model of a system for Deep Learning may include: (1) receiving a set of one or more words (hereinafter: 'words input'; e.g. a sentence); (2) entering the word set, as an input set, to a sequence classifying, deep multi-layered recurrent, and/or recursive, neural network based, word semantics derivation model, wherein the word semantics derivation model is adapted for: (i) weakly supervising the model learning by providing a substantially small amount of 'right' semantic taggings as learning examples to the model; (ii) assigning markup language semantic tags to at least some, and/or a subset, of the words; (3) repeating stages (1) and (2) one or more additional times, while utilizing stochastic gradient descend for learning 'correct' semantic tagging, and improving following taggings' outputs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

According to some embodiments of the present invention, a System for Deep Learning Based Natural Language Understanding may 'understand' a given linguistic input from a user, based on one or more correct, or partially correct, inputs introduced to the system as part of a learning/training phase/process. Based on the system's 'understanding' of the characteristics of the correct, or partially correct, inputs introduced, and based on feedbacks in regard to the level of correctness of the system outputs and respective weights tunings of the system, an understanding of the intended meaning of the user's linguistic input may be deducted.

According to some embodiments, the system may comprise: (1) a word tokenization and spelling correction model/machine for generating corrected word sets outputs based on respective character strings inputs; and/or (2) a word semantics derivation model/machine for generating semantically tagged sentences outputs based on respective word sets inputs.

According to some embodiments, each of the models/machines may go through an 'offline' training/learning phase, wherein training (e.g. not 'real' user data/linguistic-inputs) data is separately inputted to each of the machines and corresponding language and semantic models evolve. The models may evolve and improve through training as the outputs of the machines are examined for their correctness and the machines' weights are accordingly calibrated/tuned/shifted (e.g. direction and magnitude of weight tuning increase/decrease corresponds to the level of correctness of the machine's output).

According to some embodiments of the present invention, the word tokenization and spelling correction model/machine training may be unsupervised (i.e. based on substantially large amounts of uncharacterized data) wherein noise is introduced into the input training data (e.g. incrementally) to increase and/or diversify the amounts and types of data errors encountered and learned by the machine.

According to some embodiments of the present invention, the word semantics derivation model/machine training may be weakly-supervised (i.e. based on substantially small amounts of characterized data, followed by substantially large amounts of uncharacterized data) wherein 'right' examples (e.g. word sets semantically tagged correctly) constitute the initial input training data, thus yielding a supervised training phase for providing the model with initial 'correct' knowledge, which may be followed by an unsupervised training phase that is based on uncharacterized data inputs for training the model on the utilization of the accumulated knowledge for semantically tagging 'incorrect'/un-encountered inputs. Both the supervised and unsupervised training phases may be repeated (in whole or in part) multiple times until sufficient accuracy and breadth of tagging are achieved.

According to some embodiments, once the system models were sufficiently trained and reached a 'steady state', actual 'real' user data inputs may be fed to them. According to some embodiments, character strings representing linguistic user inputs may be fed to the word tokenization and spelling correction model/machine, whereas outputs of the word tokenization and spelling correction model/machine—corrected word-sets/sentences—may be used as inputs for the word semantics derivation model/machine for it to generate outputs in the form of tokenized, corrected and semantically tagged sentences.

According to some embodiments, as part of an unsupervised, or weakly supervised, learning process, linguistic input training data may be put through a word tokenization and spelling correction model.

According to some embodiments of the present invention, a neural network based system for spell correction and tokenization of natural language, may comprise: (1) An artificial neural network architecture, to generate variable length 'character level output streams' for system fed variable length 'character level input streams'; (2) An auto-encoder (may also be referred to as a 'Noise Insertion Module') for injecting random character level modifications to variable length 'character level input streams', wherein the characters may include a space-between-token character; and/or (3) An unsupervised training mechanism for adjusting the neural network to learn correct variable length 'character level output streams', wherein correct variable length 'character level output streams' needs to be identical to respective original variable length 'character level input streams' prior to their random character level modifications.

According to some embodiments, the random character level modifications may be selected from the group consisting of adding random characters, deleting characters, transposing characters and replacing characters.

According to some embodiments, the neural network may be implemented using a sequence to sequence artificial neural network architecture, sequences of the variable length 'character level input streams' may be mapped to a hidden state, and sequences of the variable length 'character level output streams' may be generated from the hidden state. According to some embodiments, the sequence to sequence artificial neural network architecture may be implemented using a bidirectional long short-term memory (LSTM) input layer.

According to some embodiments, the variable length 'character level input streams' may be Unicode character streams, and the system may further comprise a UTF-8 encoder for applying UTF-8 encoding to the Unicode character streams prior to their inputting to the neural network.

According to some embodiments, the unsupervised training mechanism may be further adapted for adjusting the neural network to learn a per-character embedding representation of the variable length 'character level input streams', in parallel to the learning of correct variable length 'character level output streams'.

According to some embodiments, the system may further comprise a random modification selector (may also be referred to as a 'Random Noise Generator') for randomly selecting the character level modifications from the group.

According to some embodiments, the auto-encoder may be further adapted for incrementing the frequency of injecting the random character level modifications to the variable length 'character level input streams', responsive to an increase in the level of similarity of the variable length 'character level output streams' to the respective original variable length 'character level input streams' prior to their random character level modifications.

According to some embodiments, at least some of the variable length 'character level input streams', fed to the system, may represent dialogs, and dialog metadata may be at least partially utilized by the artificial neural network to generate the variable length 'character level output streams'. According to some embodiments, the dialog metadata may at least partially include dialog state data.

According to some embodiments, an unsupervised, or weakly supervised, learning process, executed by a word tokenization and spelling correction model of a system for Deep Learning may include: (1) receiving a string of one or more characters; (2) encoding and indexing the characters as a multi-value index; (3) embedding each character as a numbers vector; (4) entering a matrix of one or more character number vectors, as input, to a recurrent, or a convolutional, neural network language model, wherein the language model is adapted for: (i) parsing the data into words and tokenizing the words; (ii) correcting misspelled words; and/or (iii) auto-completing words; (5) repeating stages (1)-(4) one or more additional times, while intermittently introducing noise into the input and examining the language model's output; and/or (6) tuning the language model, and/or the amount and type of introduced noise, at least partially based on the language model's examined output(s).

According to some embodiments of the present invention, as part of an unsupervised, or weakly supervised, learning process, a System for Deep Learning may: (1) receive a given linguistic input; (2) remove or add one or more parts or sections (e.g. a word) from/to the linguistic input; (3) 'guess' substitutes for some or all of the removed parts or sections; (4) generate and/or receive feedback in regard to the newly created, substitutes including, linguistic input; and/or (5) tune its decision making based on the newly created input and the feedback generated and/or received for it.

According to some embodiments, the linguistic input wordings' characters may each be embedded as a vector of values such as, but not limited to, a vector of floating point numbers, wherein the system may represent characters as a self-decided number or value. According to some embodiments, the initial characters embeddings may be randomly generated from a substantially uniform distribution with substantially small norm values. A sliding window of the characters embedded as number vectors (e.g. a matrix) may be used as the input to a neural-network for tokenization and spelling. According to some embodiments, the neural-network may, for example, be a Recurrent and/or a Convolutional Neural Network at least partially utilizing Long Short Term Memory (LSTM) gates/blocks/cells. According to some embodiments, the Recurrent and/or Convolutional Neural Network may be a bi-directional neural network, adapted to read and/or register the linguistic input wordings' character strings from both directions (i.e. characters read from beginning to end and from end to beginning).

According to some embodiments, diacritic signs or accent marks and capitalization data, of letter characters which are part of the given linguistic input's wordings, may be preserved and utilized to differentiate or un-differentiate (i.e. regard as same despite difference) specific words. According to some embodiments, the model may accordingly deduct that for informal language words such as 'Chicago' and 'chicago' or 'Munchen' and 'München', for example, may refer to similar travelling destinations—as both formats alternately appear within the multiple learning examples fed to the model—as such.

According to some embodiments, the model may learn specific templates or formats. For example, the model may learn that a set of three consecutive capital letters is often tokenized as a travelling destination (i.e. airport code) and accordingly deduct that 'SAT', for example, pertains to an airport code rather than to a short form of the word satellite, and/or that 'LAX' may be substituted by 'Lax' in the linguistic input's wordings, but nevertheless, refers to the travelling destination (Los-Angeles) and not to a type of food (gravad lax).

According to some embodiments of the present invention, as part of an auto-encoding process, one or more known artificial 'noise' elements may be introduced into the linguistic input learning data, wherein the linguistic input learning data may be unsupervised training data. A tune-up, or a relatively 'high grade', feedback may be given to the system for correct/successful handling or removal of the artificially introduced 'noise' elements as part of the system's learning process. Introduced 'noise' may be randomly added on a per-character basis. According to some embodiments, exemplary 'noise' types introduced into the linguistic input may include, but are not limited to, to the following: typos replacing letters: "dictionary" >"dictionaey"; typos omitting letters: "dictionary">"dictionay"; typos adding letters: "dictionary">"dictionnary"; phonetic mistakes: "dictionary">"dikshionary"; and/or 'space' character associated typos such as split words "dictionary">"diction ary" and/or concatenated words "hello there">"hellothere".

According to some embodiments of the present invention, the quantity of 'noise' introduced into the linguistic input learning data may be varied along the learning process. According to some embodiments, at first, or at initial learning/training stages, small amounts or no 'noise' may be introduced into learning data, thus enabling the system to automatically learn the standard tokenization pattern and/or language model structure. Once sufficient perplexity is achieved on the language model 'noise' levels may be increased allowing the neural network to focus on training and learning spelling corrections in light of the already learned language model—adding robustness to the entire model.

According to some embodiments of the present invention, corpuses and/or databases that address textual mistakes (e.g. spelling mistakes) and provide their respective fixes or corrections, may be utilized as inputs for the system's learning process. For example, Wikipedia edits, which are available for download and address spelling mistakes fixes, may be utilized as inputs for the system's learning process. According to some embodiments, a classifier may be utilized to identify versioned fixes within the Wikipedia edits, optionally, at least partially based on the 'commit comment' feature—used to approve/upload corrections made to Wikipedia entries by users. The edits, including both the mistakenly spelled word and its post-correction spelled version, may improve the system's ability to identify spelling mistakes, and to correctly handle them, within user provided linguistic inputs.

According to some embodiments of the present invention, as the dictionary of the model may be at least partially learned based on the learning data inputs, rather than set in advance, and the inputs may be character based, an emerging property of the model may be the learning and understanding of word morphology for unseen words. According to some embodiments, the system may learn to understand previously not encountered words and/or phrases based on their context, and/or based on substantially similar or similarly tokenized words. According to some embodiments, the morphology may allow for the model to comprehend previously not encountered words, mistakenly spelled words, and/or non-existing/made-up words. For example, in the input sentence "Nonstopable flight from Rome to Chicago" the made-up/typo-including word "Nonstopable" may be inferred by the model by 'analyzing' the morphology or the made-up/unseen/rare word and its surrounding context. Based on its learning, the model may segment "Nonstopable" into previously encountered and learned morphologies—"non+stop+able"; and based on the context, implying a 'flight characteristic', infer that the intended meaning was a 'non-stop' or 'direct' flight.

According to some embodiments, as part of an unsupervised, or weakly supervised, learning process, linguistic input training data may be put through a word semantics derivation model.

According to some embodiments of the present invention, a neural network based system for word semantic derivation, or semantic role assignment (may also be referred to as 'Semantic Tagging', 'Tagging' or 'Labeling') of dialog utterances (may also be referred to as 'Word Sets' or 'Sentences'), may comprise: (1) An artificial recurrent neural network architecture, implemented using long short-term memory (LSTM) cells, to generate variable length 'tagged tokens output streams' for system fed variable length 'dialog utterance input streams'; and/or (2) A weakly supervised training mechanism for feeding to the artificial recurrent neural network, one or more variable length 'dialog utterance input streams' with their respective correctly-tagged variable length 'tagged tokens output streams', as initial input training data, and for adjusting the neural network to learn correct variable length 'tagged tokens output streams', by generating, and suggesting for system curator tagging correctness feedback—additional variable length 'dialog utterance input streams' with their respective variable length 'tagged tokens output streams' as tagged by the recurrent neural network—wherein correct tagging of the suggested additional variable length 'dialog utterance input streams' improves the capability of the recurrent neural network to refine the decision boundaries between correctly and incorrectly tagged inputs and to more correctly tag following system fed variable length 'dialog utterance input streams'.

According to some embodiments, at least some of the variable length 'dialog utterance input streams', fed to the system, may represent dialogs, and dialog metadata may be at least partially utilized by the artificial recurrent neural network to generate the variable length 'tagged tokens output streams'. According to some embodiments, the dialog metadata may at least partially include dialog state data.

According to some embodiments, the weakly supervised training mechanism may be further adapted to modify the variable length 'tagged tokens output stream' of a specific given incorrectly tagged variable length 'dialog utterance input stream', without retraining of the entire recurrent neural network, by reiterating the variable length 'dialog utterance input stream' and applying gradient learning with a low learning rate across multiple training epochs.

According to some embodiments, the weakly supervised training mechanism may be further adapted to self-improve while actively handling real end-user variable length 'dialog utterance input streams' by utilizing under-utilized Central Processing Unit (CPU) cycles of its hosting computer to run additional epochs of training.

According to some embodiments, variable length 'character level output streams' generated, for corresponding system fed variable length 'character level input streams', by the artificial neural network architecture of a system for spell correction and tokenization, may be fed as variable length 'dialog utterance input streams', to the system for semantic role assignment of dialog utterances.

According to some embodiments, an unsupervised, or weakly supervised, learning process, executed by a word semantics derivation model of a system for Deep Learning may include: (1) receiving a set of one or more words (e.g. 'words input', 'word set', 'sentence'); (2) entering the word set, as an input set, to a sequence classifying, deep multi-layered recurrent, and/or recursive, neural network based, word semantics derivation model, wherein the word semantics derivation model is adapted for: (i) weakly supervising the model learning by providing a substantially small amount of 'right' semantic taggings as learning examples to the model; (ii) assigning markup language semantic tags to at least some, and/or a subset, of the words; (3) repeating stages (1) and (2) one or more additional times, while utilizing stochastic gradient descend for learning 'correct' semantic tagging, and improving following taggings' outputs.

According to some embodiments, markup language semantic tags, may be based on a specific markup language, and/or intended for the context domain of the word semantics derivation model's expected words inputs (e.g. a traveling associated markup language).

According to some embodiments, semantic tags may not necessarily be based on and/or associated with specific words, word sets, or other segments of the input words or sentence. Accordingly, tags may be implied from the general context of the input, and/or from implying in regard to additional wanted/clarifying/needed inputs based on the original one. For example, an input sentence requesting 'a hotel in Los Angeles' with no additional information, may imply that check-in and check-out times are needed (e.g. they were present in prior 'correct' learning inputs associated with hotel reservation) and the sentence may be accordingly tagged: 'requesting times'. Additional implied tags may, for example, include the location of the hotel within Los Angeles, and/or the type of room wanted.

According to some embodiments, implied tags may be utilized for co-reference resolution, wherein following or additional words inputs provided 'fit', or answer, to implied tags suggesting the lack of specific wanted/clarifying/needed data in a prior input. For example, the input word 'Monday' following to a 'requesting time' tagged input, may indicate that for the 'hotel in Los Angeles', the requested check-in time is Monday. Additionally, within a dialogue, for example with a customer-support machine agent, the implied tag 'requesting time' after the 'hotel in Los Angeles' input may trigger a 'When would you like to stay in Los Angeles?' question from the agent's side.

According to some embodiments, a cost function may be utilized to calculate or define the size of the mistake/distance/cost of the currently learned words input from previous inputs learned by the system, thus enabling the conversion of the tagging results into tuning of the neural network and improvement of the learning process.

According to some embodiments, the cost function may be designed to at least partially, see no, or see little, contradiction or semantic distance, between substantially similar words or sentence segments within two words input occurrences, even if the similar word or segment has been tagged on one of the occurrences and has not been tagged on the other. For example, the untagged word 'flight' within the sentence: 'Flight to Chicago' may be defined to have a short semantic distance from the tagged word 'flight' within the sentence 'Flight (tag='transport-type') to Boston' although un-tagged in the first sentence, and tagged in the second. According to some embodiments, some or all of the words and/or segments within the words input may be labeled or tagged with a 'don't care' or 'insignificant' label/tag, suggesting to the cost function that regardless of its tagging or lack of such, this word/segment should be considered semantically close to a similar, or substantially similar, tagged or un-tagged word/segment in another words input.

According to some embodiments, the word semantics derivation model may select and suggest one or more candidate words inputs (e.g. sentences) for tagging, based on a 'seed' words input previously tagged, or currently being tagged; candidate word inputs may be provided by the word semantics derivation model along with information as to why these candidates were proposed (e.g. distances between the 'seed' and each of candidate words inputs' vector embedding values). According to some embodiments, the system may provide 'manual' feedback to the model as to the level of similarity between the 'seed' words input tagging and the taggings of each of the candidate words inputs suggested. According to some embodiments, the suggested taggings of the candidate words inputs may be altered by the system based on the manual 'feedback' provided.

According to some embodiments, certain sections (e.g. a specific word, or words set) of the suggested candidate words inputs, to which no corresponding tagged sections were found in the 'seed' words input (e.g. no parallel sections in 'seed' input, parallel sections in 'seed' are too distanced), may be ignored by not being tagged based on the 'seed' input. According to some embodiments, incrementally distanced candidate words inputs may be aimed at, possibly until a candidate words input(s), irrelevant to the 'seed' words input, is/are suggested, and the training session (selection of further candidate words inputs) may be terminated. According to some embodiments, supervised and unsupervised training of the model may be continued as part of the system's regular, post-learning operation, using the 'seed' and candidate words inputs.

For example:
Original 'seed' words input: 'Flight to Chicago';
Suggested candidate words input: 'Flights to Madrid on Monday';
Vector embedding of the phrase "Flights to" is very similar to that of the phrase "Flight to" and is thus similarly tagged;
Vector representation of "Madrid" is very similar to that of "Chicago" and is thus similarly tagged;
"On Monday" section of the candidate words input is unlabeled/untagged (i.e. no such parallel section in the 'seed' words input) and hence ignored; and
Distance (from the original and added tagged sentences) is incrementally increased until an irrelevant sentence (e.g. "How do I cancel my ticket?") is reached, at which point the system trainer can choose to stop the model's training.

According to some embodiments, forced training may be used for obligating the deep learning process, wherein a great deal of complexity may exist between the input data and the final output, to correctly label or tag a given input, for example when a 'bug' within the process, is preventing further convergence to a correct output. According to some embodiments, 'Induced Trauma', wherein the same exemplary input is repetitively fed into the system to apply learning (e.g. based on Stochastic Gradient Descent), may be utilized. The system may insist on the model supplying a correct answer, by repetitively feeding the same input and examining the model's self-reached answer, wherein each repeated input feeding iteration slightly diverts ('nudges') the model towards the correct output.

Accordingly, certain model inputs, or input types, leading to specific errors (e.g. a repeating incorrect semantic tagging) in the model's corresponding outputs, may be repetitively fed to the model along with instructions to lock/keep-unchanged model weights associated with taggings of the certain input that are not related to the specific errors. The model may thus 'focus' on the tuning of weight(s) associated with the specific error, changing and improving its outputs until the specific error is cured and a correct/satisfactory tagging of the certain input is reached. For example, the word set 'LA flight' may be erroneously tagged as follows: 'LA [departure place] flight [form of transportation]'. The tagging of the word 'flight' as the 'form of transportation' may be determined to be correct, whereas the correct semantic tagging for a place name, 'LA' in our case, appearing before the 'form of transportation' would most likely be 'destination place'. The correct 'form of transportation' tagging may accordingly be 'locked', while the word set 'LA flights' is refed to the model until a correct taggings output—'LA [destination place] flight [form of transportation]'—is generated by the model.

According to some embodiments, specific words inputs for 'Forced Training' or 'Trauma Induced Training' may be grouped in a separate corpus. According to some embodiments, 'Forced Training' corpus inputs may be designated with a higher 'weight' than other 'regular' corpora inputs, thus making them more likely to be elected and drawn for the model's training. According to some embodiments, the selected 'weight' allocated to the 'Forced Training' corpus inputs may be set empirically, by finding the value providing optimal results (e.g. 10 times higher probability of selection compared to 'regular' corpora inputs).

According to some embodiments of the present invention, the word semantics derivation model may utilize dialog structure logic for, and/or as part of, words inputs tagging. According to some embodiments, the model may learn about dialog and discourse based on the enumeration of questions asked as part of learned dialog words inputs from its corpus/corpora. Questions asked by the system as part of a dialog may be fed as inputs, along with other dialog words inputs, to the model, enabling model learning of discourse-based language logical and structural characteristics/constraints. According to some embodiments, enumerated questions may be coupled-to/grouped-with/paired-with relevant corresponding answers and/or responses.

For example, if the dialog corpus from which the system learns looks like this:
User: Flight to Chicago
Intelligent Agent: When?
User: Tomorrow
Questions asked by the system are fed into the model as well, so that the input that the model learns looks like this:

<us> Flight to Chicago </us>
<as> When? </as>
<us> Tomorrow </us>
Where <us> means User Start of Sentence; </us> means User End of Sentence; <as> means Intelligent Agent Start of Sentence; and </as> means Intelligent Agent End of Sentence.

In the present example, the system learns that the language model depends on the discourse. A user input such as: <us> Tomorrow </us> makes much more sense after a "When?" question from the Intelligent Agent. Semantically, in this example, Tomorrow is labeled/tagged as the 'Departure Time from the Origin' (to Chicago), which is impossible to deduct on a sentence-to-sentence based analysis level.

Furthermore, some of the output labels/tags may only make sense in the context of the preceding dialog. For example, in the following dialog:
<us> Flight to Chicago on Monday</us>
<as> When would you like to return?</as>
<us> I don't</us>
"I Don't" is labeled/tagged as a 'Flight Attribute—One Way', which is impossible to deduct on a sentence-to-sentence based analysis level, without comprehending the entire dialog.

According to some embodiments of the present invention, the word semantics derivation model may utilize dialog related metadata for, and/or as part of, words inputs tagging. According to some embodiments, the model may learn about dialog and discourse based on the context world of the 'dialog's metadata'. According to some embodiments, dialog metadata types may include, but are not limited to, those pertaining to: the scope of the metadata and the hosting application's general context (e.g. traveling—flights, hotels etc.); specific contexts of the dialog, and/or utterance(s) within it, relevant to specific capabilities of the application's scope, such as the current interest of the user, derived, for example, from the application's page/function that the user is viewing/using; and/or positioning data such as latitude and longitude of the end user.

According to some embodiments, dialog metadata, such as the exemplary metadata types described above, may be utilized for understanding the meaning of the dialog and for its semantic tagging. For example: when a user says "Chicago" and the context is Hotels, it probably means she is looking for a hotel in Chicago. If, however, the Context is Flights than she is probably looking for a flight TO Chicago, unless the positioning data coordinates show that she is already in Chicago, in which case she is looking for a flight FROM Chicago elsewhere. The Metadata may be fed into the model like this:
<us><sfh><cf> Chicago </us>
Where <sfh> means Scope=Flights and Hotels; and
<cf> means Context=Flights.

According to some embodiments of the present invention, when system traffic is low, the word semantics derivation model may reiterate the training data, possibly at a low learning rate, in a process called 'Dreaming'. According to some embodiments, new data may also be added to the iterated data to facilitate long continuous, gradual and ongoing improvement, rather than a high impact fire-and-forget learning process. According to some embodiments, one or more 'must not fail' training examples, that the model will very likely, or surely, be able to handle, may be used as a safety net for preventing the model from having a 'bad dream'—i.e. failing to succeed and thus failing to learn, or reaching wrong conclusions and thus learning incorrectly. This may allow for a better, and/or more constant, utilization of computing resources as part of the training process, and may lead to a gradual and continuous training based improvements. According to some embodiments, the 'Dreaming' or 'Ongoing Learning' process may take place after the initial training phase of the model, after the model has already processed 'real' user data, and/or in between 'real time' data processing sessions; and may be triggered and/or halted at least partially based on available system resources that are not 'busy' processing 'real' user data at that specific time period. 'Dreaming' training data may include, but is not limited to, artificial, made-up, and/or curated data inputs.

According to some embodiments of the present invention, the word semantics derivation model may 'understand' specific, previously unencountered words and/or phrases, based on the context of neighboring words and/or phrases. For example, based on a user request for 'A flight from Qweqwe airport to JFK' it may be deducted that Qweqwe is either a name of an airport or a name of a town/city where the user wants to depart from. According to some embodiments, and as exemplified, no prior labeling/tagging may be needed, and the word/name Qweqwe may be first encountered by the model; the word 'airport' however, allows the model to learn about the nature and semantics of the 'new', previously unencountered, word from its context.

According to some embodiments of the present invention, the cost function of the word semantics derivation model may, as part of calculating a 'distance' between two words inputs and/or phrases, may calculate cosine distances between embeddings of additions, subtractions, transpositions and/or concatenations of one or both of the words-inputs/phrases. According to some embodiments, the model may thus be able to compare more examples, and enhance its knowledge of additional, close or substantially similar, terms, in the 'semantic vicinity' of the labeled/tagged data.

According to some embodiments of the present invention, the system may intermittently shrink or grow various dimensions of the models' neural network. According to some embodiments, shrinking the network (also known as 'Pruning') may remove artificial 'neurons'/cells of the neural network, upon their value dropping beyond a certain threshold—indicating an over-fitting of the network, thus enabling better generalization capabilities by the network. Shrinking the network, in accordance with some embodiments, may not zero/nullify specific network 'neurons'/cells, but rather remove them completely from the network, and may thus lessen the number of 'neurons'/cells that need to be trained allowing for a faster learning process.

According to some embodiments, the system may start with a substantially small neural network implementation (e.g. less layers, less hidden states in each of the layers, reduced dimensionality of the words and characters embeddings), growing it upon demand and/or based on its self-monitored performance. According to some embodiments, growing the neural network may, for example, be triggered by the system, after a certain time period, wherein no substantial improvements were made to the learning process, has passed—indicating an under-fitting of the network. According to some embodiments, growing the neural network may, for example, be triggered by the system, upon a certain part or layer of the neural network franticly/chaotically tries to adapt by changing its 'weight' too frequently (i.e. the gradient of the gradient of the change is too large for at least some of the learning-batches (e.g. each of the mini-learning-batches).

According to some embodiments of the present invention, the word tokenization and spelling correction model/machine and/or the word semantics derivation model/machine may each be implemented as multiple/parallel machines each comprising multiple 'neurons'/cells. According to some embodiments, weights, of 'better' (i.e. providing more correct, and/or better corrected, outputs) machines, and/or 'better' 'neurons'/cells or 'neurons'/cells groups, may be propagated to 'weaker', or 'less correct', machines, thus allowing the later to 'catch up', incorporate 'understandings' achieved by other machines/cells/cell-groups into their own 'knowledge', and/or improve the collective learning pace of the entire models.

Figure 1:
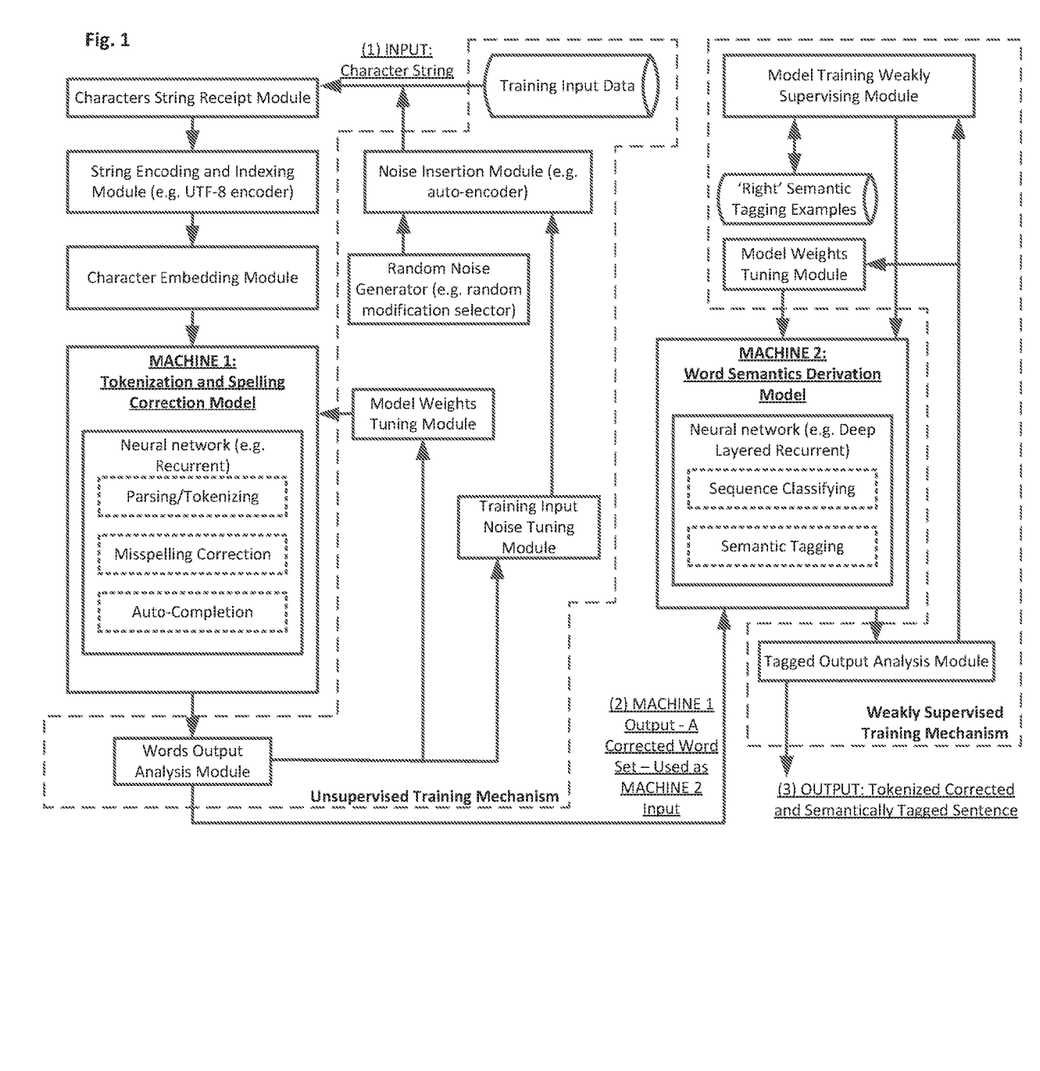
FIG. 1 is a block diagram of an exemplary system for deep learning based natural language understanding, comprising a tokenization and spelling correction model/machine and a word semantics derivation model/machine, in accordance with some embodiments of the present invention.

In FIG. 1 there is shown an exemplary system for deep learning based natural language understanding, comprising a tokenization and spelling correction model/machine and a word semantics derivation model/machine, in accordance with some embodiments of the present invention.

The exemplary system shown comprises: a tokenization and spelling correction model/machine and a word semantics derivation model/machine. The spelling correction model/machine comprises a Characters String Receipt Module for receiving from a Training Input Data database/corpus character string inputs (e.g. training data during model learning and 'real' user data once in its 'steady state'), and/or for sourcing at least some of the training phase character strings inputs for the word tokenization and spelling correction language-model from corpuses or databases that address textual mistakes and provide their respective fixes or corrections (e.g. Wikipedia). The inputs may possibly include noise, inserted by a Noise Insertion Module. The inserted 'noise' is generated by a Random Noise Generator that produces character strings inputs 'noise' on a per-character basis. A String Encoding and Indexing Module encodes and indexes the string's input characters which are then prepared for being fed into the model's recurrent, and/or convolutional, neural network by a Character Embedding Module.

The spelling correction model's neural network processes the inputs (training or 'real' inputs) parsing, tokenizing, correcting spelling mistakes, and/or completing words having missing characters. A Word Output Analysis Module receives the output of the neural network and utilizes a cost function to determine, for the received output, which cells' weights are to be tuned, by how much, and/or in which direction (i.e. increase or decrease weight). During the model's training phase, a Training Inputs Noise Tuning Module determines whether the amounts of noise introduced into the input should be increased or decreased. Weights tuning and/or noise amounts information are then relayed to the neural network and to the Noise Insertion Module, respectively.

The Word Semantics Derivation Model/Machine comprises a Model Training Weakly Supervising Module for initially feeding to the model's deep layered recurrent, and/or recursive, neural network with 'seeded data' including correct semantically tagged examples, followed by unsupervised word set inputs for the neural network to train on, and learn, based on its initial knowledge from the correct tagging examples. Once the model has reached its 'steady state' it can be fed with word set inputs based on 'real' user data processed and outputted by the spelling correction model.

The semantic tagging model's neural network processes the inputs (training or 'real' inputs) sequence classifying and/or semantically tagging the words in the input word-set/sentence. A Tagged Output Analysis Module receives the output of the neural network and utilizes a cost function to determine, for the received output, which cells' weights are to be tuned, by how much, and/or in which direction (i.e. increase or decrease weight). During the model's training phase, the Tagging Output Analysis Module also determines whether to feed the neural network with additional correct examples. The Tagged Output Analysis Module then outputs the input word-set/sentence semantically tagged.

Figure 2A:
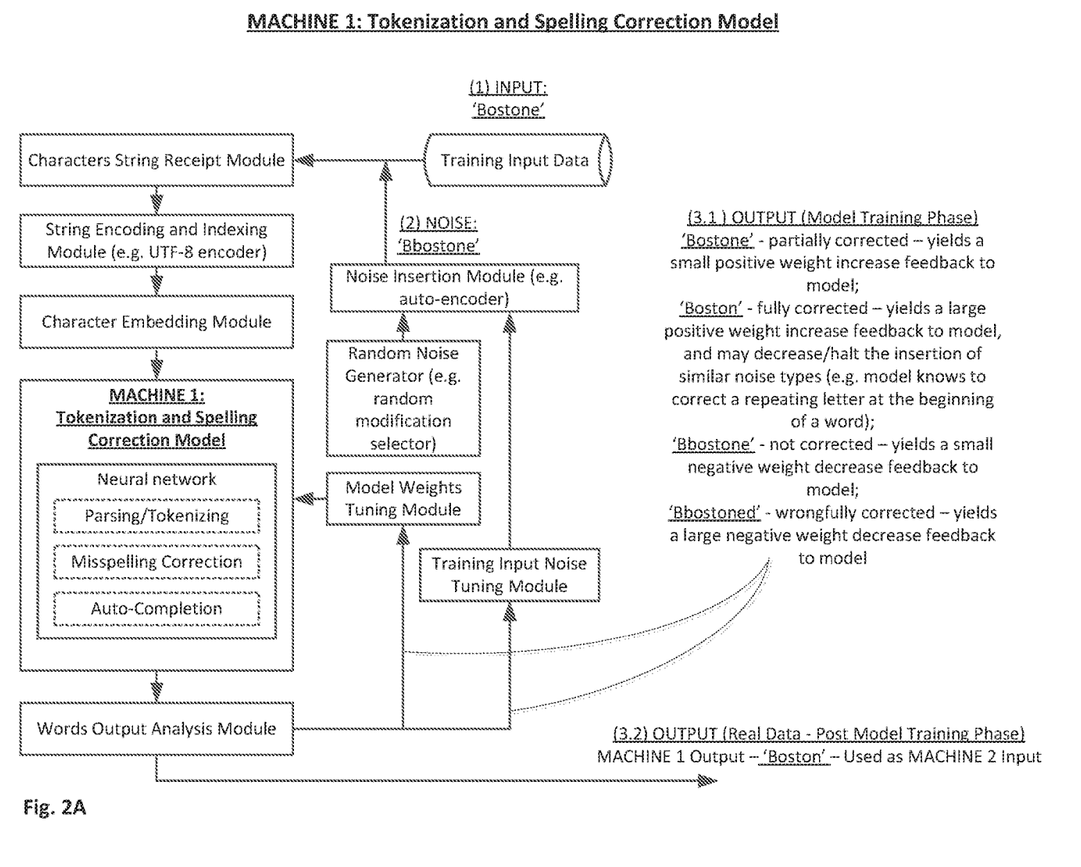
FIG. 2A is a block diagram showing the structure and exemplifying the operation of an exemplary tokenization and spelling correction model/machine, in accordance with some embodiments of the present invention.

FIG. 2A is a block diagram showing the structure and exemplifying the operation of an exemplary tokenization and spelling correction model/machine, in accordance with some embodiments of the present invention. The word 'Bostone' (city of 'Boston' with a mistake) is shown to constitute the initial input, while the word 'Bbostone' includes further noise (an additional 'b') added to the original input. The output of the model is then examined by the Words Output Analysis Module, and the model's cells are tuned based on the quality, or level of correctness in comparison to the input, of the output. Accordingly, the Model Weights Tuning Module, tunes the neural network's weights in the example, as follows:

Output is 'Bostone'—partially corrected—yields a small positive weight increase feedback to model;

Output is 'Boston'—fully corrected—yields a large positive weight increase feedback to model, and may decrease/halt the insertion of similar noise types (e.g. model knows to correct a repeating letter at the beginning of a word);

Output is 'Bbostone'—not corrected—yields a small negative weight decrease feedback to model; and/or Output is 'Bbostoned'—wrongfully corrected—yields a large negative weight decrease feedback to model.

Figure 2B:
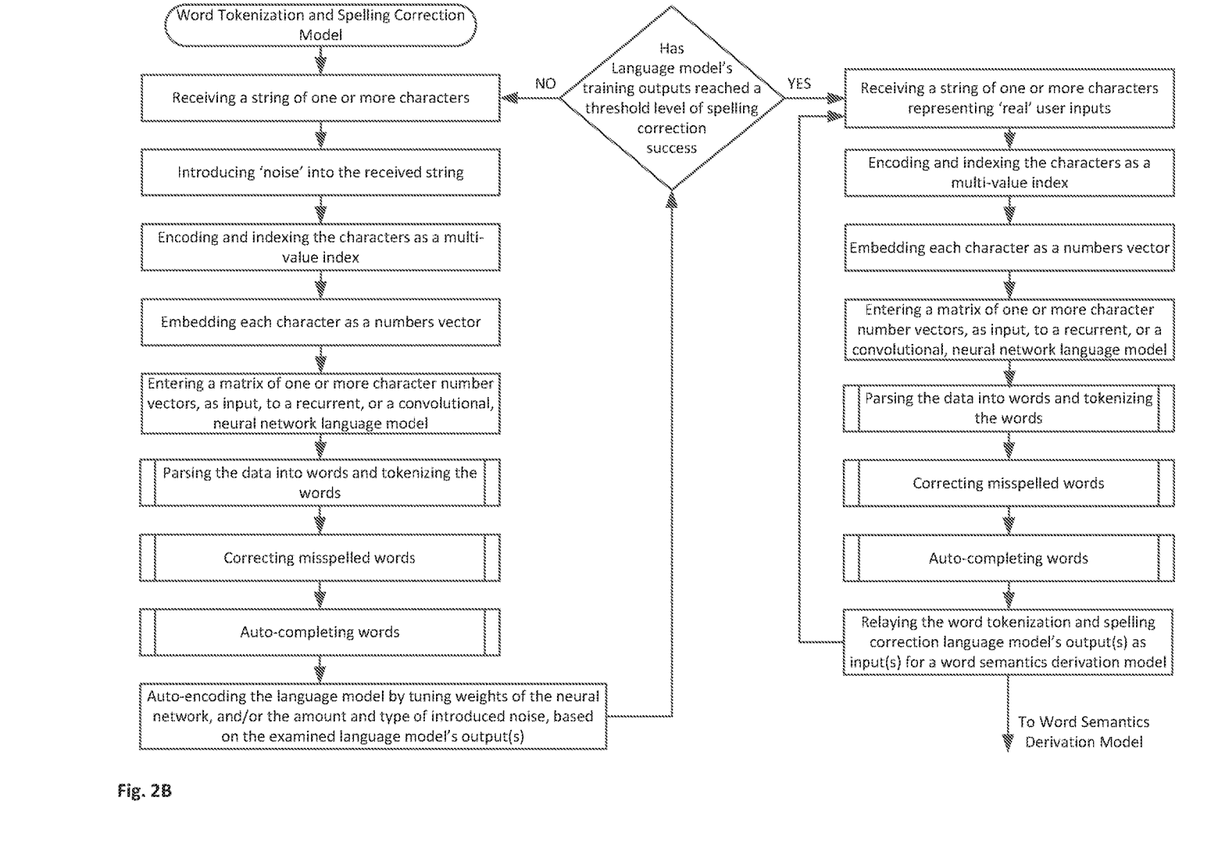
FIG. 2B is a flow chart showing the main operation steps and flow of an exemplary tokenization and spelling correction model/machine, in accordance with some embodiments of the present invention.

FIG. 2B is a flow chart showing the main operation steps and flow of an exemplary tokenization and spelling correction model/machine, in accordance with some embodiments of the present invention.

Figure 3A:
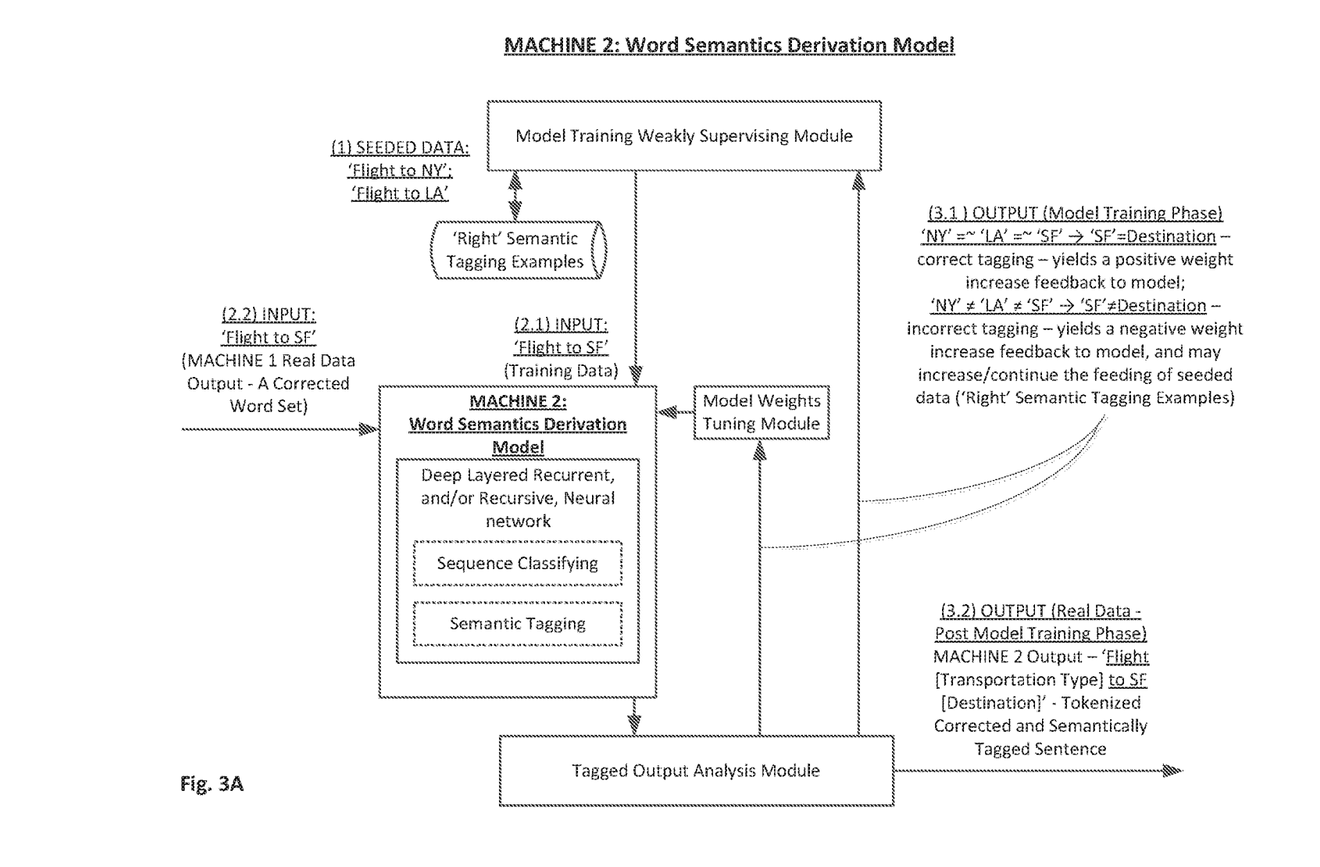
FIG. 3A is a block diagram showing the structure and exemplifying the operation of an exemplary word semantics derivation model/machine, in accordance with some embodiments of the present invention.

FIG. 3A is a block diagram showing the structure and exemplifying the operation of an exemplary word semantics derivation model/machine, in accordance with some embodiments of the present invention. The seeded data is shown to include the word-sets 'flight to NY' and 'flight to LA', whereas the input is the word-set 'flight to SF'. The Model Weights Tuning Module, tunes the neural network's weights in the example, as follows:

'NY'=~'LA'=~'SF'→'SF'=Destination—correct tagging—yields a positive weight increase feedback to model; and/or 'NY'≠'LA'≠'SF'→'SF'≠Destination—incorrect tagging—yields a negative weight increase feedback to model, and may increase/continue the feeding of seeded data ('Right' Semantic Tagging Examples).

Figure 3B:
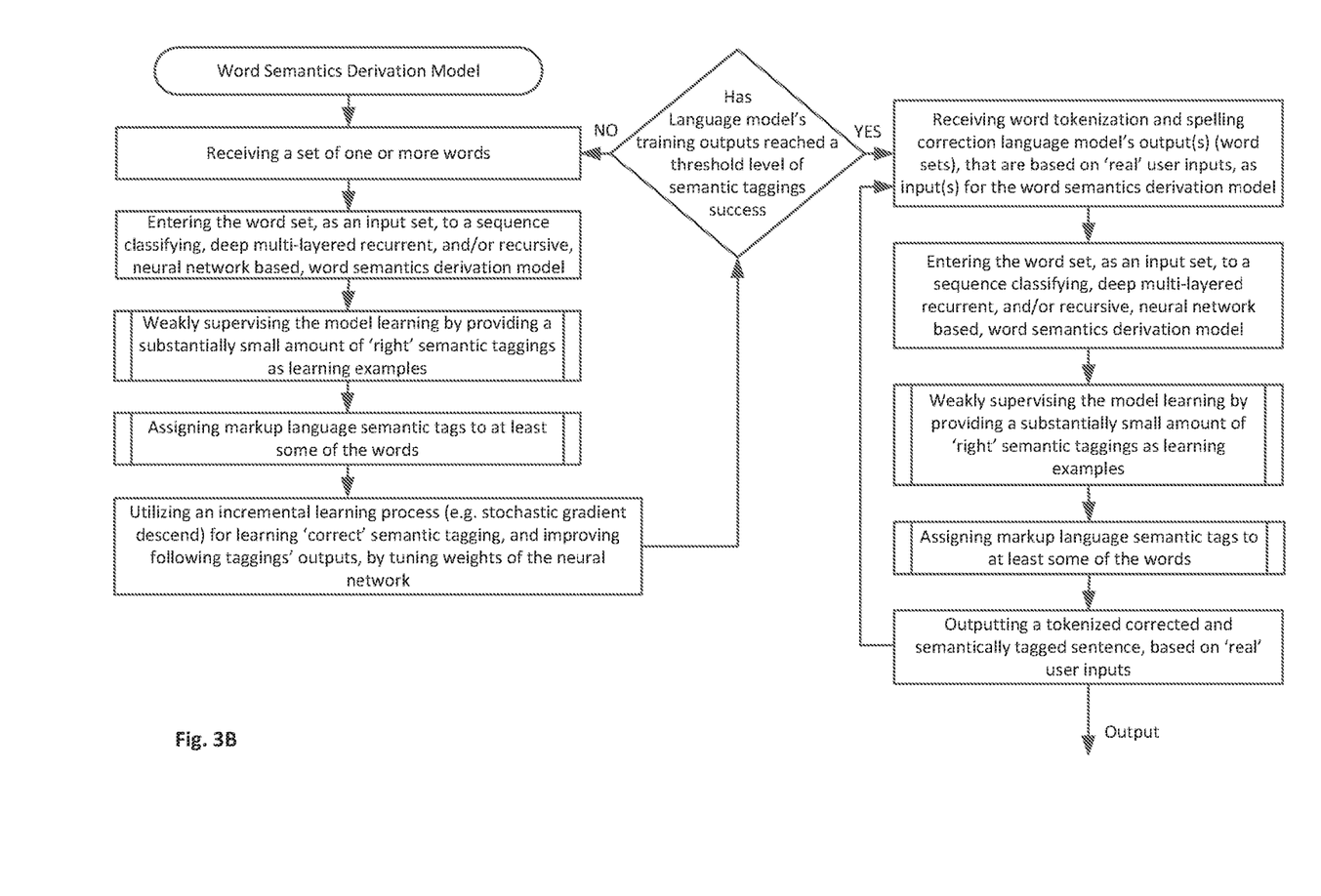
FIG. 3B is a flow chart showing the main operation steps and flow of an exemplary word semantics derivation model/machine, in accordance with some embodiments of the present invention.

FIG. 3B is a flow chart showing the main operation steps and flow of an exemplary word semantics derivation model/machine, in accordance with some embodiments of the present invention.

According to some embodiments of the present invention, a system for training one or more neural network based natural language processors, may comprise: a random noise generator for producing character strings inputs 'noise' on a per-character basis; and a noise insertion module for intermittently introducing the produced 'noise' into machine training character strings inputs fed to a 'word tokenization and spelling correction language-model' including a neural network comprised of Long Short Term Memory (LSTM) cells collectively configured to tokenize the inputs and to generate spell corrected word sets outputs.

According to some embodiments, the system may further comprise a word output analysis module for analyzing the generated corrected word sets outputs and estimating their level of correctness; and/or a training input noise tuning module for adjusting the amounts of 'noise' to be introduced into following training inputs fed to said word tokenization and spelling correction language-model, at least partially based on the estimated level of correctness of the generated corrected word sets outputs.

According to some embodiments, the training input noise tuning module may increment the amount of 'noise' to be introduced into following training inputs, when the level of correctness of the generated word sets outputs for the current training input, as estimated by the word output analysis module, has increased in comparison to the level of correctness of the generated word sets outputs of a set of one or more previous training inputs.

According to some embodiments, the introduced 'noise' may be selected from the 'noise' types group consisting of: replacing letters, omitting letters, adding letters, phonetic mistakes, 'space' character associated typos, and/or concatenated words.

According to some embodiments, a characters string receipt module may source at least some of the training phase character strings inputs of the word tokenization and spelling correction language-model from corpuses or databases that address textual mistakes and provide their respective fixes or corrections.

According to some embodiments, the system may comprise a model training weakly supervising module for feeding machine training word sets inputs to a word semantics derivation model, wherein the semantics derivation model may include a neural network configured to semantically tag word set inputs and to generate semantically tagged sentences outputs, and wherein fed machine training word sets inputs may include one or more 'right' examples of correctly semantically-tagged word sets as initial input training data, and uncharacterized word sets as following input training data.

According to some embodiments, generating semantically tagged sentences may be at least partially based on implying in regard to additional word sets inputs that may clarify a prior word sets input. According to some embodiments, at least some of the word sets inputs, fed to the word semantics derivation model, may be dialogs, and dialog metadata may be at least partially utilized for the semantic tagging of the word sets dialog inputs.

According to some embodiments, the system may further comprise a Tagged Output Analysis Module for identifying word sets training inputs that lead to specific tagging errors in the word semantics derivation model's respective outputs, and/or for instructing the model training weakly supervising module to repetitively feed the identified word sets inputs to the semantic model while locking model weights associated with taggings of the repetitively fed inputs that are not related to the specific tagging errors. According to some embodiments, the identified word sets inputs may be repetitively fed until a correct respective tagging output is generated by the semantic model.

According to some embodiments, upon system models reaching a training 'steady state', the word tokenization and spelling correction language-model may be fed with input character strings representing 'real' linguistic user inputs, generating word sets outputs that may be fed as inputs to the word semantics derivation model for generating semantically tagged sentences outputs.

According to some embodiments, in between 'real' linguistic user inputs data processing sessions of said language and semantic models, training data may be reiterated by the models at a low learning rate.

According to some embodiments of the present invention, a method for training one or more neural network based natural language processors, may comprise: randomly producing character strings inputs 'noise' on a per-character basis; intermittently introducing the produced 'noise' into machine training character strings inputs fed to a 'word tokenization and spelling correction language-model' including a neural network comprised of Long Short Term Memory (LSTM) cells collectively configured to tokenize the inputs and to generate spell corrected word sets outputs; analyzing the generated corrected word sets outputs and estimating their level of correctness; and/or adjusting the amounts of 'noise' to be introduced into following training inputs fed to the word tokenization and spelling correction language-model, at least partially based on the estimated level of correctness of the generated corrected word sets outputs.

According to some embodiments, adjusting the amounts of 'noise' to be introduced into following training inputs may include incrementing the amount of 'noise' to be introduced into the following training inputs, when the estimated level of correctness of the generated word sets outputs for the current training input, has increased in comparison to the level of correctness of the generated word sets outputs of a set of one or more previous training inputs.

According to some embodiments, introduced 'noise' may be selected from the 'noise' types group consisting of: replacing letters, omitting letters, adding letters, phonetic mistakes, 'space' character associated typos, and concatenated words.

According to some embodiments, the method may further comprise sourcing at least some of the training phase character strings inputs fed to the word tokenization and spelling correction language-model from corpuses or databases that address textual mistakes and provide their respective fixes or corrections.

According to some embodiments, the method may comprise feeding machine training word sets inputs to a word semantics derivation model, wherein the semantics derivation model includes a neural network configured to semantically tag word set inputs and to generate semantically tagged sentences outputs, and wherein fed machine training word sets inputs include one or more 'right' examples of correctly semantically-tagged word sets as initial input training data, and uncharacterized word sets as following input training data.

According to some embodiments, generating semantically tagged sentences may be at least partially based on implying in regard to additional word sets inputs that may clarify a prior word sets input.

According to some embodiments, at least some of the word sets inputs, fed to the word semantics derivation model, may be dialogs, and dialog metadata may be at least partially utilized for the semantic tagging of the word sets dialog inputs.

According to some embodiments, the method may further comprise identifying word sets training inputs that lead to specific tagging errors in the word semantics derivation model's respective outputs; and repetitively feeding the identified word sets inputs to the semantic model while locking model weights associated with taggings of the repetitively fed inputs that are not related to the specific tagging errors, until a correct respective taggings output is generated by the semantic model.

According to some embodiments, the method may further comprise monitoring the outputs of the language model and the semantic model, and upon models reaching a training 'steady state' feeding the word tokenization and spelling correction language-model with input character strings representing 'real' linguistic user inputs; processing the 'real' linguistic user inputs and generating respective word sets outputs; feeding the word sets outputs as inputs to the word semantics derivation model; and/or processing the word sets outputs and generating respective semantically tagged sentences outputs.

According to some embodiments, in between 'real' linguistic user inputs data processing sessions of the language model and the semantic model, training data may be reiterated by the models at a low learning rate.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A system for spell correction and tokenization of natural language, said system comprising:
   an artificial recurrent neural network architecture of long short-term memory (LSTM) cells configured to generate: (i) variable length character level output streams (CLOS) for system fed variable length character level input streams (CLIS) and (ii) variable length tagged tokens output streams (TTOS) for system fed variable length dialog utterance input streams (DUIS);
   a first computer readable medium including instructions for an auto-encoder for injecting random character level modifications to the variable length CLIS, wherein the characters include a space-between-token character;
   a second computer readable medium including instructions for a weakly supervised training mechanism for feeding to said artificial recurrent neural network variable length DUIS, with respective correctly tagged variable length TTOS, as initial input training data, and for adjusting said recurrent neural network to learn correct variable length TTOS, by generating, and suggesting for system curator tagging correctness feedback, additional variable length DUIS, with respective variable length TTOS, as tagged by said recurrent neural network;
   wherein correct tagging of the suggested additional variable length DUIS improves the capability of said recurrent neural network to refine the decision boundaries between correctly and incorrectly tagged inputs and to more correctly tag following system fed variable length DUIS;
   and wherein variable length CLOS generated by said artificial neural network for variable length CLIS, are fed as variable length DUIS to said artificial recurrent neural network;
   and
   a third computer readable medium including instructions for an unsupervised training mechanism for adjusting said neural network to learn correct variable length CLOS, wherein correct variable length CLOS need to be similar to respective original variable length CLIS prior to random character level modifications.

2. The system according to claim 1, wherein the random character level modifications are selected from the group consisting of: adding random characters, deleting characters, transposing characters and replacing characters.

3. The system according to claim 2, wherein said neural network is implemented using a sequence to sequence artificial neural network architecture, sequences of the variable length CLIS are mapped to a hidden state and sequences of the variable length CLOS are generated from the hidden state.

4. The system according to claim 3, wherein the sequence to sequence artificial neural network architecture is implemented using a bidirectional LSTM input layer.

5. The system according to claim 4, wherein the variable length CLIS are Unicode character streams, and further comprising a UTF-8 encoder for applying UTF-8 encoding to the Unicode character streams prior to their inputting to said neural network.

6. The system according to claim 5, wherein said unsupervised training mechanism is further adapted for adjusting said neural network to learn a per-character embedding representation of the variable length CLIS, in parallel to the learning of correct variable length CLOS.

7. The system according to claim 2, further comprising a random modification selector for randomly selecting the character level modifications from the group.

8. The system according to claim 7, wherein said auto-encoder is further adapted for incrementing the frequency of injecting the random character level modifications to the variable length CLIS, responsive to an increase in the level of similarity of the variable length CLOS to the respective original variable length CLIS prior to their random character level modifications.

9. The system according to claim 1, wherein at least some of the variable length CLIS, fed to the system represent dialogs, and dialog metadata is at least partially utilized by said artificial neural network to generate the variable length CLOS.

10. The system according to claim 9, wherein dialog metadata at least partially includes dialog state data.

11. A system for semantic role assignment of dialog utterances, said system comprising:
    an artificial recurrent neural network architecture of long short-term memory (LSTM) cells configured to generate variable length tagged tokens output streams (TTOS) for system fed variable length dialog utterance input streams (DUIS); and
    a computer readable medium including instructions for a weakly supervised training mechanism for:
        feeding to said artificial recurrent neural network, one or more variable length DUIS with respective correctly tagged variable length TTOS, as initial input training data, and for
        adjusting said recurrent neural network to learn correct variable length tagged tokens output streams, by generating, and suggesting for system curator tagging correctness feedback, additional variable length DUIS with respective variable length TTOS, as tagged by said recurrent neural network;
    wherein correct tagging of the suggested additional variable length DUIS improves the capability of said recurrent neural network to refine the decision boundaries between correctly and incorrectly tagged inputs and to more correctly tag following system fed variable length DUIS.

12. The system according to claim 11, wherein at least some of the variable length DUIS fed to the system represent dialogs and dialog metadata is at least partially utilized by said artificial recurrent neural network to generate the variable length TTOS.

13. The system according to claim 12, wherein dialog metadata includes dialog state data.

14. The system according to claim 11, wherein said weakly supervised training mechanism is further adapted to modify a variable length TTOS of a specific given incorrectly labeled variable length DUIS, without retraining of the entire said recurrent neural network, by reiterating the variable length DUIS and applying gradient learning with a low learning rate across multiple training epochs.

15. The system according to claim 11, wherein said weakly supervised training mechanism is further adapted to self-improve while actively handling real end-user variable length DUIS by utilizing under-utilized Central Processing Unit (CPU) cycles of its hosting computer to run additional epochs of training.

16. A method for spell correction and tokenization of natural language, said method comprising:

feeding variable length character level input streams (CLIS) to an artificial recurrent neural network architecture of long short-term memory (LSTM) cells, to generate: (i) variable length character level output streams (CLOS) and (ii) variable length tagged tokens output streams (TTOS) for system fed variable length dialog utterance input streams (DUIS);

injecting random character level modifications to the variable length CLIS, wherein the characters include a space-between-token character;

feeding to the artificial recurrent neural network variable length DUIS, with respective correctly tagged variable length TTOS, as initial input training data, adjusting said recurrent neural network to learn correct variable length TTOS, by generating, and suggesting for system curator tagging correctness feedback, additional variable length DUIS, with respective variable length TTOS, as tagged by said recurrent neural network;

wherein correct tagging of the suggested additional variable length DUIS improves the capability of said recurrent neural network to refine the decision boundaries between correctly and incorrectly tagged inputs and to more correctly tag following system fed variable length DUIS;

and wherein variable length CLOS generated by said artificial neural network for variable length CLIS, are fed as variable length DUIS to said artificial recurrent neural network; and adjusting the neural network to learn correct variable length CLOS, wherein correct variable length CLOS need to be similar to respective original variable length CLIS prior to random character level modifications.

17. The method according to claim 16, wherein the random character level modifications are selected from the group consisting of: adding random characters, deleting characters, transposing characters and replacing characters.

18. The method according to claim 16, further comprising implementing a sequence to sequence artificial neural network architecture, wherein sequences of the variable length CLIS are mapped to a hidden state and sequences of the variable length CLOS are generated from the hidden state.

19. The method according to claim 18, further comprising implementing the sequence to sequence artificial neural network using a bidirectional long short-term memory (LSTM) input layer.

20. The method according to claim 16, further comprising adjusting said neural network to learn a per-character embedding representation of the variable length CLIS, in parallel to the learning of correct variable length CLOS.

* * * * *